US011033978B2

(12) United States Patent
Mnich

(10) Patent No.: US 11,033,978 B2
(45) Date of Patent: Jun. 15, 2021

(54) ARC VOLTAGE SENSING AND CONTROL FOR A WELDING APPARATUS

(71) Applicant: ESAB AB, Gothenburg (SE)

(72) Inventor: Andrzej Mnich, Gothenburg (SE)

(73) Assignee: ESAB AB, Gothenburg (SE)

( * ) Notice: Subject to any disclaimer, the term of this patent is extended or adjusted under 35 U.S.C. 154(b) by 577 days.

(21) Appl. No.: 15/907,351

(22) Filed: Feb. 28, 2018

(65) Prior Publication Data

US 2019/0262929 A1 Aug. 29, 2019

(51) Int. Cl.
*B23K 9/10* (2006.01)
*B23K 9/095* (2006.01)
*H02M 3/157* (2006.01)
*H02M 3/156* (2006.01)
*H02M 1/00* (2006.01)

(52) U.S. Cl.
CPC .......... *B23K 9/1062* (2013.01); *B23K 9/0953* (2013.01); *B23K 9/1006* (2013.01); *H02M 3/156* (2013.01); *H02M 3/157* (2013.01); *H02M 2001/0016* (2013.01)

(58) Field of Classification Search
CPC ........ B23K 9/09; B23K 9/095; B23K 9/0953; B23K 9/0956; B23K 9/1006; B23K 9/1012; B23K 9/1062; H02M 3/156; H02M 3/157; H02M 2001/0016
USPC .............. 219/130.01, 130.1, 130.21, 130.31, 219/137 R, 137 PS
See application file for complete search history.

(56) References Cited

U.S. PATENT DOCUMENTS

| | | | | |
|---|---|---|---|---|
| 6,025,573 A | * | 2/2000 | Stava | B23K 9/092 219/130.01 |
| 2008/0084721 A1 | | 4/2008 | Miramonti et al. | |

(Continued)

FOREIGN PATENT DOCUMENTS

WO 2008033901 A2 3/2008

OTHER PUBLICATIONS

Office Action for Canadian Patent Application No. 3,033,673 dated Feb. 7, 2020, 6 pages.

(Continued)

*Primary Examiner* — Vishal Pancholi
*Assistant Examiner* — Robert K Nichols, II
(74) *Attorney, Agent, or Firm* — Edell, Shapiro & Finnan, LLC

(57) ABSTRACT

A method for determining a value of arc voltage in a welding system, the welding system including a switch mode power supply and a controller that controls operation of the switch mode power supply, the method including, during an active power delivery stage of the switch mode power supply sensing a first internal voltage ($V_{20}$) within the switch mode power supply prior to an internal inductor and a first output voltage ($V_{21}$) of the switch mode power supply; during a freewheeling stage of the switch mode power supply sensing a second internal voltage ($V_F$) within the switch mode power supply prior to the internal inductor and a second output voltage ($V_{22}$) of the switch mode power supply; and determining the value of arc voltage based on the first internal voltage, the first output voltage, the second internal voltage, and the second output voltage.

18 Claims, 8 Drawing Sheets

(56) References Cited

U.S. PATENT DOCUMENTS

2010/0308026 A1    12/2010  Vogel
2018/0050409 A1*  2/2018  Mehn .................. B23K 9/0953

OTHER PUBLICATIONS

Extended European Search Report for EP Patent Application No. 19157164.5, dated Jul. 26, 2019, 9 pages.
Examination Report No. 1 for Australian Patent Application No. 2019201426 dated Feb. 18, 2020, 3 pages.

\* cited by examiner

ARC VOLTAGE SENSING AND CONTROL FOR A WELDING APPARATUS

TECHNICAL FIELD

Embodiments described herein are related to sensing and controlling an arc voltage generated by a welding apparatus.

BACKGROUND

In modern welding switched mode power supplies an output inductor's purpose is mainly to reduce ripple of the output current. This is in contrast to conventional power supplies in which the inductor not only reduces the ripple of the output current, but also creates the necessary dynamic response. Since a switch mode power supply operates at ultra-acoustic frequencies (e.g., 20 kHz, 50 kHz, 100 kHz), the required inductance of the output inductor is relatively small compared to the inductance of the external power (or welding) cables. And, in very high frequency applications using a switch mode power supply, the inductance of the cables may be significantly higher than that of the output inductor such that the output inductor may be effectively ignored as part of the circuit, or even removed as a component of the power supply.

The inductance of the welding cables can be variable and thus difficult to characterize. For example, cables may be of varying lengths, cable extenders and/or aftermarket cables may be employed, and/or cables may be in the vicinity of ferromagnetic materials. Thus, when the arc voltage is changing rapidly, the voltage measured on the output of the power supply is significantly less than or higher than the actual arc voltage, not only because of the resistance of the cables, but much more because of the presence of the inductance in the external circuit, namely the welding cables. That is, there is an undesirable lag between the actual arc voltage and the sensed arc voltage, leading to, possibly, sub-optimal power supply control for a given welding method.

BRIEF SUMMARY

Described herein is a method for determining a value of arc voltage in a welding system without voltage sensing cables in the vicinity of a welding arc, the welding system including a switch mode power supply and a controller that controls operation of the switch mode power supply, the switch mode power supply including an internal inductor having a predetermined inductance value, the method comprising: sensing a first internal voltage ($V_{20}$) within the switch mode power supply prior to the internal inductor during an active power delivery stage of the switch mode power supply; sensing a first output voltage ($V_{21}$) of the switch mode power supply during the active power delivery stage of the switch mode power supply; sensing a second internal voltage ($V_F$) within the switch mode power supply prior to the internal inductor during a freewheeling stage of the switch mode power supply; sensing a second output voltage ($V_{22}$) of the switch mode power supply during a freewheeling stage of the switch mode power supply; and determining the value of arc voltage based on the first internal voltage, the first output voltage, the second internal voltage, and the second output voltage.

Also described herein is a welding power supply configured to determine a value of arc voltage in a welding system without voltage sensing cables in the vicinity of a welding arc during the termination of the power delivery lasting more than one period of the operation cycle of the welding power supply including a switch mode power supply and a controller that controls operation of the switch mode power supply, the switch mode power supply including an internal inductor ($L_1$) having a predetermined, in general, current dependent inductance, the welding power supply including a processor that, when executing logic instructions, is configured to: sense a first internal voltage ($V_{20}$) within the switch mode power supply prior to the internal inductor during an active power delivery stage of the switch mode power supply; sense a first output voltage ($V_{21}$) of the switch mode power supply during the active power delivery stage of the switch mode power supply; sense a second internal voltage ($V_F$) within the switch mode power supply prior to the internal inductor during a freewheeling stage of the switch mode power supply; sense a second output voltage ($V_{22}$) of the switch mode power supply during a freewheeling stage of the switch mode power supply; sense an output current ($I_2$); and determine the value of arc voltage based on the first internal voltage, the first output voltage, the second internal voltage, the second output voltage, the output current and the predetermined inductance of the internal inductor.

DETAILED DESCRIPTION

Figure 1:
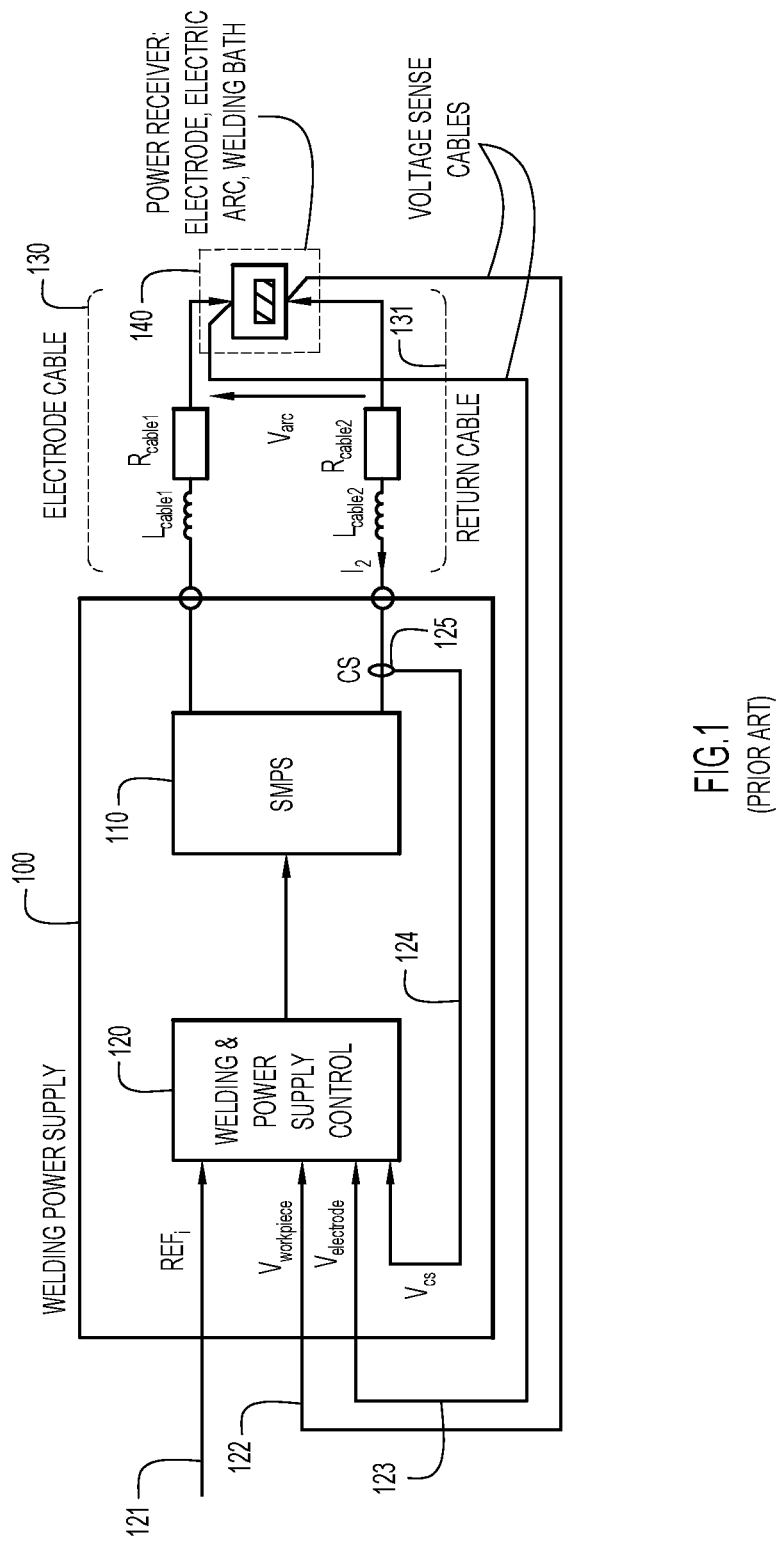
FIG. 1 is a schematic diagram of a prior art welding system.

FIG. 1 is a schematic diagram of a prior art welding system. The welding system includes power supply 100 that comprises a switch mode power supply (SMPS) 110 that is controlled by a welding and power supply control circuit (hereinafter "control circuit") 120. An electrode cable 130 and return cable 131 are connected to respective output terminals of welding power supply 100. As indicated in the figure, each of these cables includes inductance and resistance characteristics denoted as $L_{Cable1}$, $R_{Cable1}$, $L_{Cable2}$, $R_{Cable2}$. A power receiver 140 comprising, e.g., an electrode, electric arc, and welding bath completes the electrical circuit including the welding power supply 100 and cables 130, 131.

Control circuit 120 is configured to receive several inputs including a vector of reference physical measures of the welding process 121 (e.g., voltages, currents, power), a voltage of a workpiece $V_{workplace}$ 122, a voltage of the electrode (e.g., at the torch) $V_{electrode}$ 123, and the output welding current $I_{out}$ 124, generated from a current sensor 125. $V_{workplace}$ 122 and $V_{electrode}$ 123 are fed back to control circuit 120 via voltage sense cables whose endpoints are connected as close as possible to power receiver 140. While this arrangement is possible, it is actually not practical to connect the voltage sense cables in the manner shown in view of the energy being delivered at the power receiver 140, and users typically find additional cabling inconvenient.

As will be explained in detail below, in accordance with the embodiments described herein, a controller is configured to sample various voltages internal to a welding power supply during successive power delivery and freewheeling stages of an SMPS and thereby obtain an accurate measure of the arc voltage. The disclosed approach eliminates the need, and the inconvenience, of outside voltage sensing cables returning to the power supply.

The methodology described herein is applicable to a switch mode power supply having inductive character at the output, that operates in continuous current mode and is equivalent to a buck converter, with two stages of operation: an energy delivery stage (stage I) and freewheeling stage (stage II) that successively cycle at a high frequency.

In an embodiment, the methodology also comprises sensing arc voltage at a time when current is still present in the output while the switch mode power supply has stopped power delivery and the output continues to operate only in accordance with its freewheeling stage. This instance may occur, for example, during pulse skipping or upon the completion of the welding operation.

In another embodiment, the methodology still further comprises sensing arc voltage when current is terminated, but the power supply continues to deliver voltage. This instance is called open-circuit operation.

Figure 2:
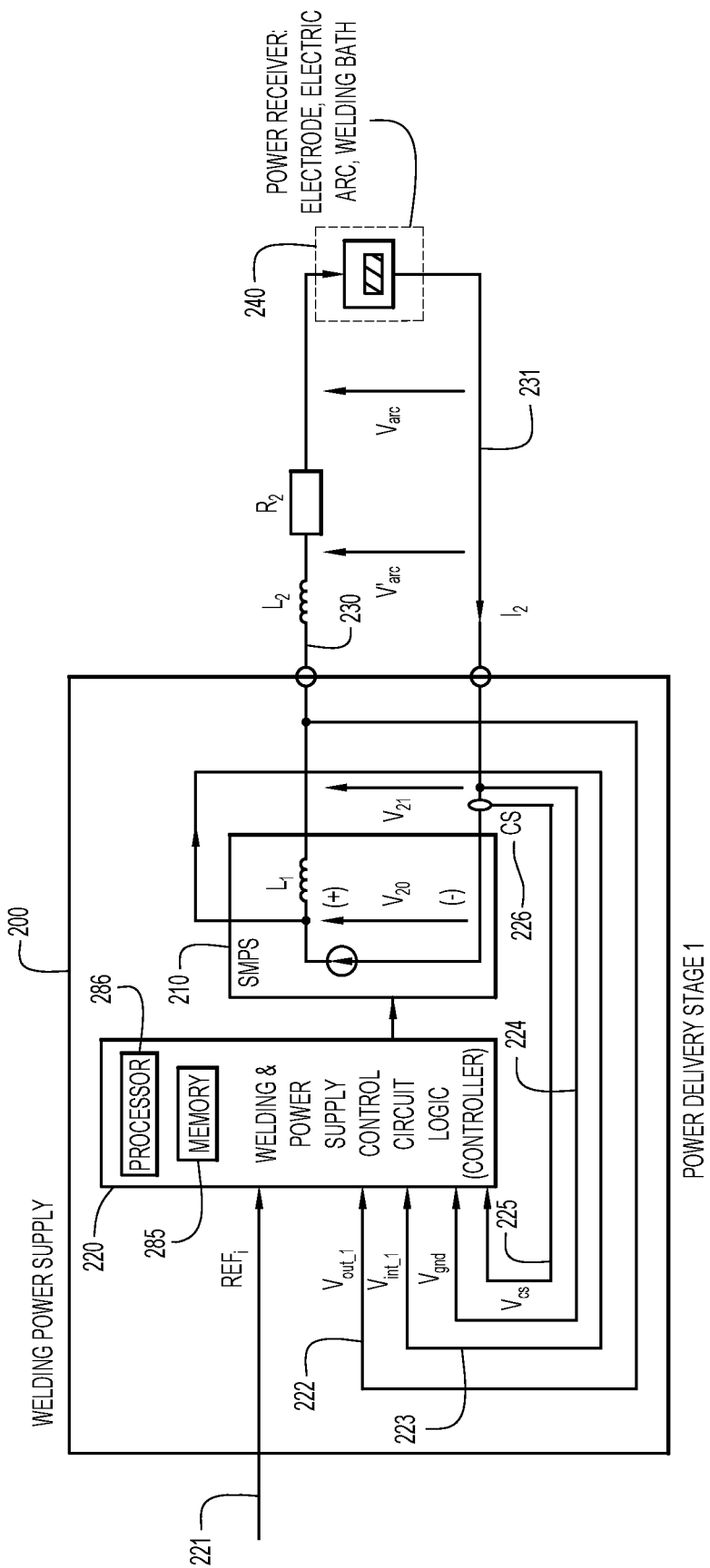
FIG. 2 is a schematic diagram of a welding system and several relevant measures when a switch mode power supply is in a power delivery stage in accordance with an example embodiment.

FIG. 2 is a schematic diagram of a welding system and several relevant measures when the switch mode power supply is in a power delivery stage in accordance with an example embodiment. The welding system includes power supply 200 that comprises a switch mode power supply (SMPS) 210 that is controlled by welding and power supply control circuit logic (hereinafter "controller") 220. Controller 220 may include memory 285 and a processor 286. An electrode cable 230 and return cable 231 are connected to respective output terminals of welding power supply 200. As indicated in the figure, cables 230, 231 have a combined resistance $R_2$, and a combined inductance $L_2$. A power receiver 240 comprising, e.g., an electrode, electric arc, and welding bath completes the electrical circuit including the welding power supply 200 and cables 230, 231. As further shown, SMPS 210 includes an internal inductor having inductance $L_1$.

Controller 220 is configured to receive several inputs including:

a vector of reference physical measures of the welding process 221 (e.g., voltages, currents, power);

$V_{out\_1}$ 222—electrical potential of the output of power supply 200 connected to electrode (i.e., torch (not shown));

$V_{int\_1}$ 223—electrical potential of the output of power supply 200 taken prior to $L_1$;

$V_{gnd}$ 224—electrical potential of the output connected to workpiece; and $V_{cs}$ 225—output (welding) current $I_{out}$, obtained via current sensor 226.

The following additional values are defined, and shown in FIG. 2:

$V_{arc}$—arc voltage $V'_{arc}$—arc voltage increased by the voltage drop related to cable resistance $R_2$;

$V_{21}=V_{out\_1}-V_{gnd}$ during stage I—output voltage during power delivery phase of SMPS 210; and $V_{20}=V_{int\_1}-V_{gnd}$ during stage I—output voltage sensed before internal inductor $L_1$ during power delivery phase of SMPS 210.

Figure 3:
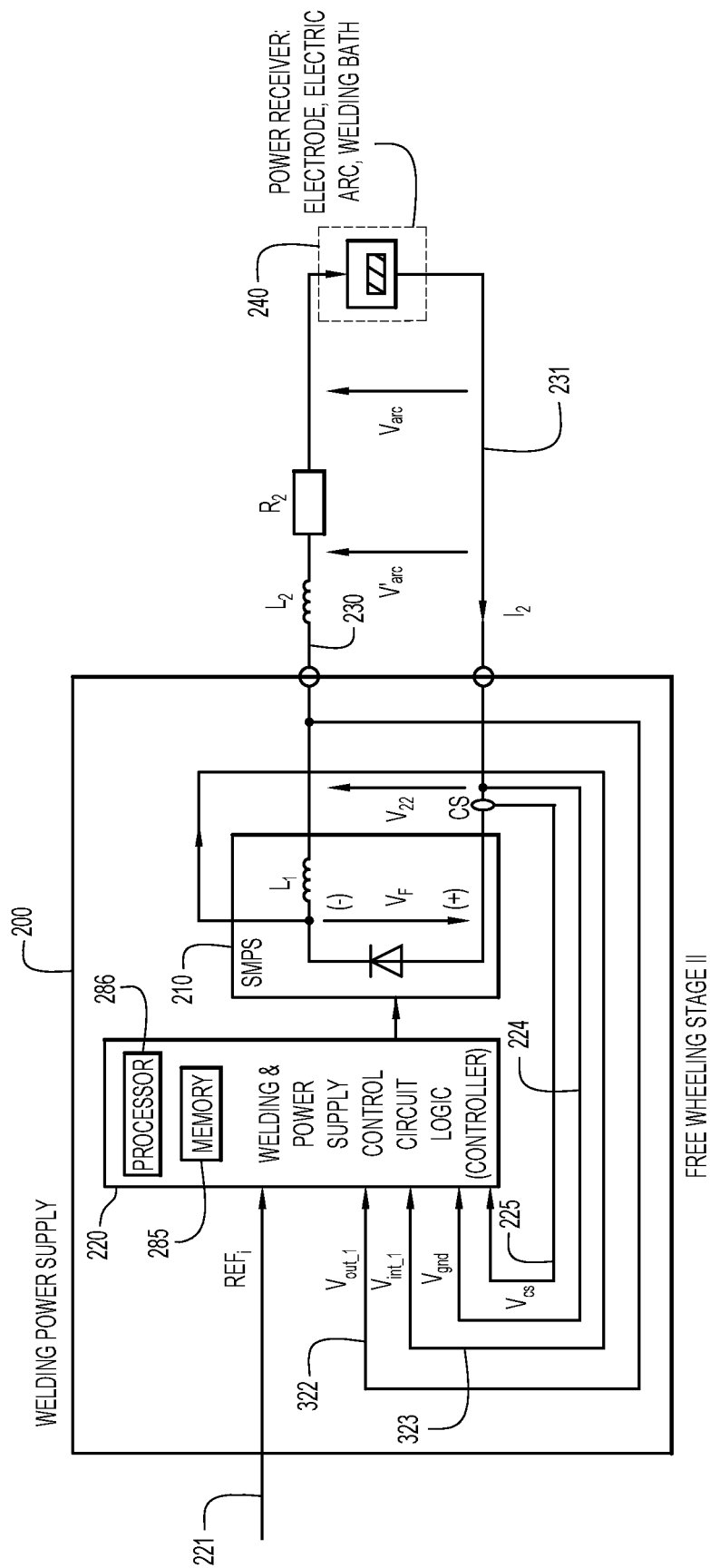
FIG. 3 is a schematic diagram of a welding system and several relevant measures when the switch mode power supply is in a freewheeling stage in accordance with an example embodiment.

FIG. 3 is a schematic diagram of a welding system and several relevant measures when the switch mode power supply is in a freewheeling stage in accordance with an example embodiment. FIG. 3 is substantially the same as FIG. 2, but indicates several additional values that are relevant, for purposes of the instant discussion, during the power supply's freewheeling operation stage.

$V_{out}$ 322—electrical potential of the output of power supply 200 connected to electrode (i.e., torch (not shown)); and $V_{int}$ 323—electrical potential of the output of power supply 200 taken prior to $L_1$.

The following additional values are defined, and shown in FIG. 3:

$V'_{arc}=V_{arc}-I_2R_2$=arc voltage increased by the voltage drop related to cable resistance $R_2$;

$V_{22}=V_{out}-V_{gnd}$ during stage II—output voltage during freewheeling phase of SMPS 210; and $V_F=V_{int}-V_{gnd}$ during stage II—output voltage sensed before internal inductor $L_1$ during freewheeling phase of SMPS 210.

The several values defined above in connection with FIGS. 2 and 3 are employed in a methodology applicable to a switch mode power supply using pulse width modulation (PWM). Welding switch mode power supplies differ from typical switch mode power supplies in that they have only an inductor ($L_1$, FIGS. 2 and 3) and no capacitor on the output. As noted, FIG. 2 and FIG. 3 present several values of voltage, current, and inductance, etc. in the power delivery and freewheeling stages of switch mode power supply 200. These several values are relied upon in the discussion below.

Figure 4:
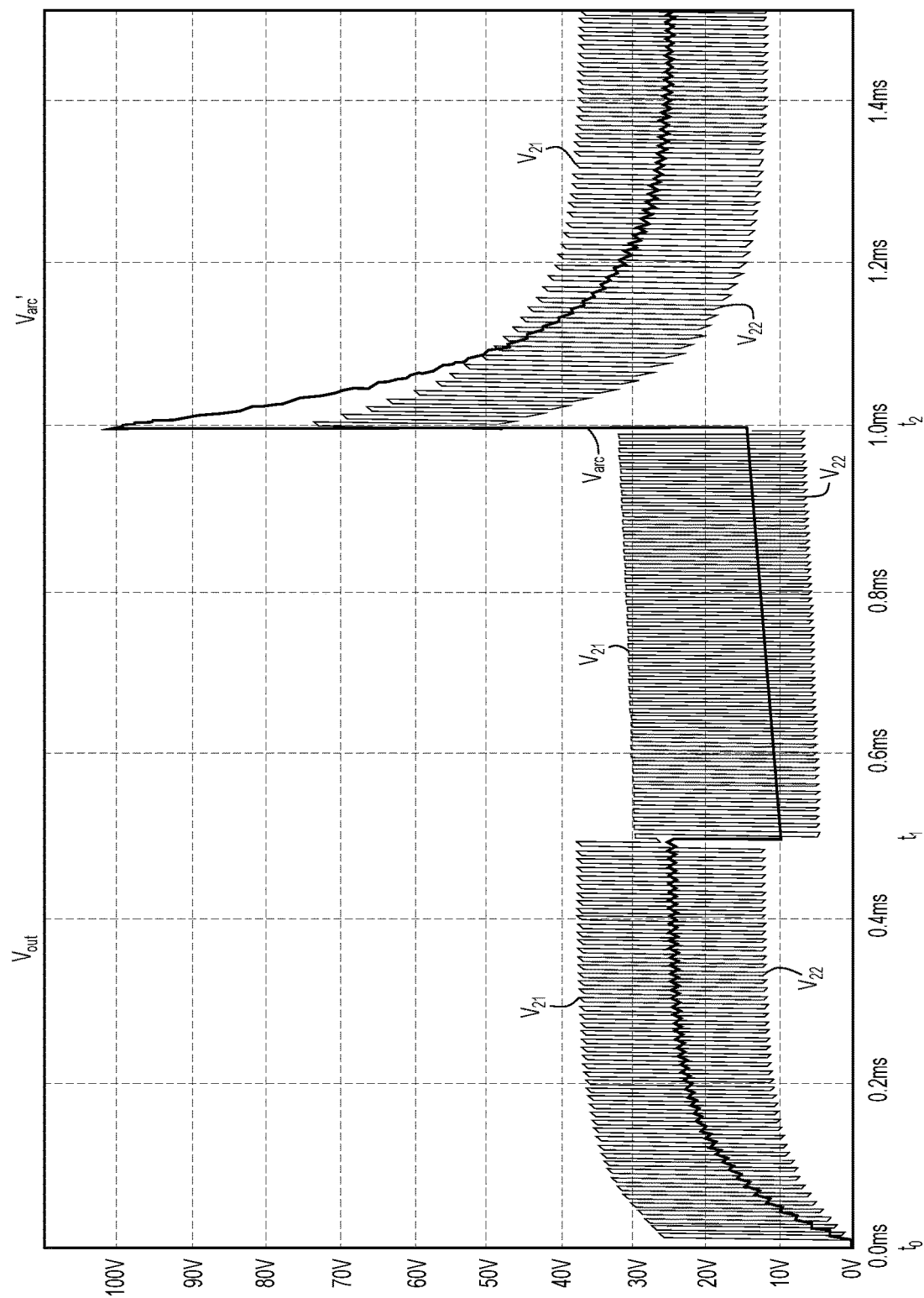
FIG. 4 depicts a plot of voltage versus time on the output of the welding system power supply and a load voltage.

FIG. 4 depicts a plot of voltage versus time on the output of power supply 200 and a load voltage, i.e., $V_{arc}$. As is seen, the power supply output voltage having pulse character with peak values $V_{21}$, and the bottom values $V_{22}$ follows the load voltage $V_{arc}$. To illustrate this, two changes of the load, at about t1=0.5 ms and t2=1 ms, are shown. At the moment t0=0 ms the power supply starts to deliver power and the output voltage reaches its final approximately constant value. In the moment of time t1, the output voltage was instantly lowered by the connection of a low voltage clamp. Then in the moment t2, the clamp is disconnected, which causes a transitional process with visible voltage surge and consequent return to the value before the moment t1.

The discussion below explains how the ratio of inductances $L_1$, $L_2$ in the welding system can be derived from several of the voltage values indicated in FIGS. 2 and 3 (and shown in FIG. 4), and how the actual arc voltage can be obtained without the need for arc voltage sense cables, or even knowing the values of $L_1$ and $L_2$.

Relevant equation for Stage I—power delivery $$\frac{V_{20} - V_{21}}{V_{21} - V'_{arc}} = \frac{L_1}{L_2} \quad (1)$$

Relevant equation for Stage II—freewheeling $$\frac{-V_F - V_{22}}{V_{22} - V'_{arc}} = \frac{L_1}{L_2} \quad (2)$$

Solving the system of equations (1) (2), it may be derived that:

$$V'_{arc} = \frac{V_{20} \cdot V_{22} + V_F \cdot V_{21}}{V_{22} + V_{20} + V_F - V_{21}} \quad (3)$$

The methodology implements a delay in the voltage sensing, since the result may be created only after completing of the voltage measurements in both stages I and II. The delay in arc voltage sense may be defined as:

$\Delta t = (D[n] + \delta)T$, or $\Delta t = (1 - D[n] + \delta)T$, and $\Delta t < T$ where $D[n]$–duty cycle on the period n
T—period of the operation of power supply, for instance
T=1/fsw for a buck converter, single forward converter
T=2/fsw for a full bridge converter, half-bridge converter, double forward converter
$\delta T$—intentional, additional delay in measurement.

Thus the value of the arc voltage delay can be reached within one period of the output voltage ripple. Such a delay is much less than the delay implemented by a conventional filter applied to an arc voltage sense. In accordance with an embodiment, the sensed voltage measures are updated in discrete moments of time and they remain constant up to the next update.

Figure 5:
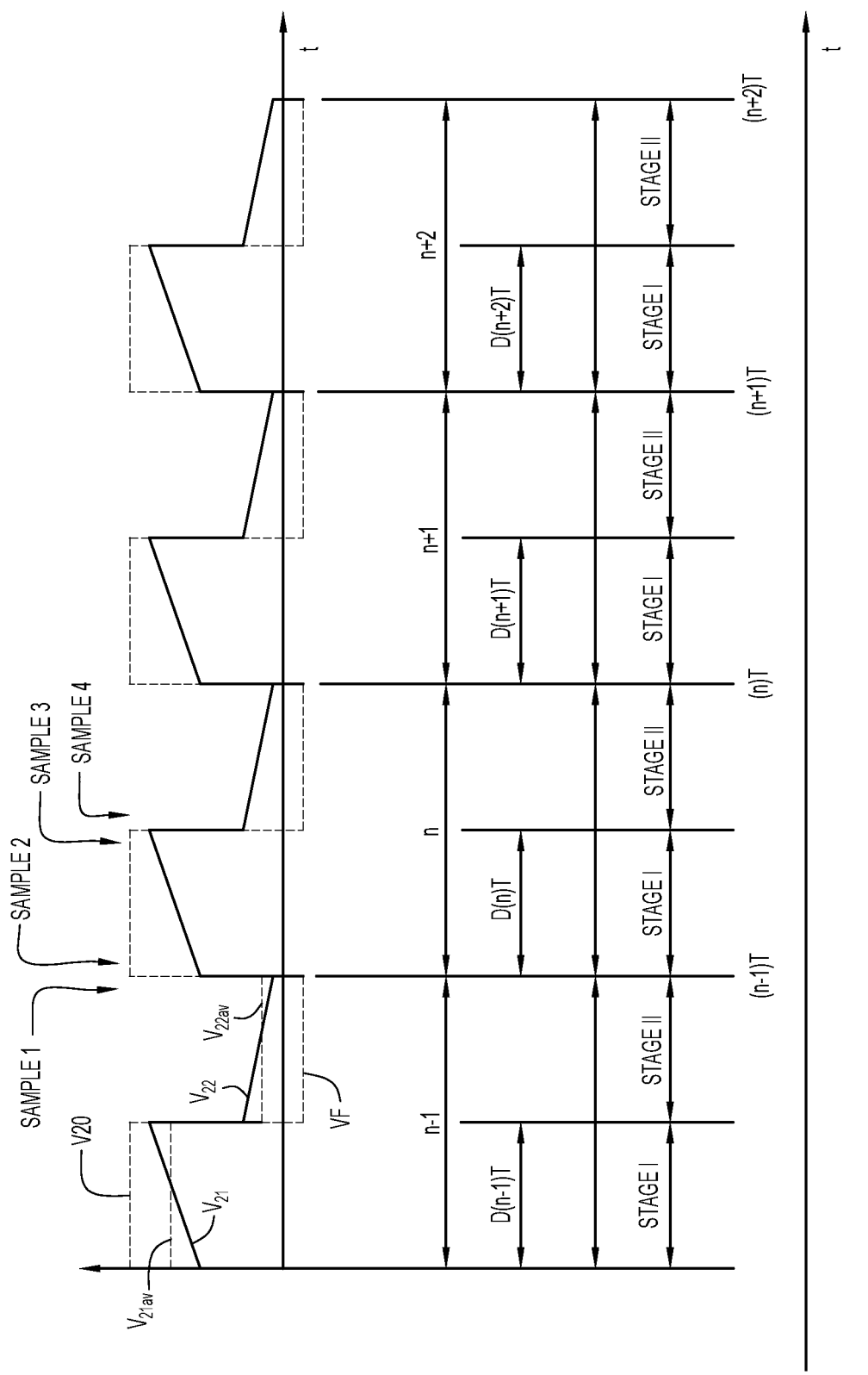
FIG. 5 depicts a timing diagram for the switch mode power supply and instances in time when samples may be taken, in accordance with an example embodiment.

FIG. 5 depicts a timing diagram for the switch mode power supply 210 and instances in time when samples may be taken, in accordance with an example embodiment. In the figure, n represents the number of the period and the period includes stage I and stage II timeframes.

It can be noted that equation (3), derived from equations (1) and (2), is valid for both stages. Thus, the arc voltage during a given stage may be defined as a derivative of the present stage voltages and the voltages captured during the previous stage. Referring again to FIG. 5, calculations can be performed based on samples taken during two consecutive stages, where either stage I or stage II is first.

In this regard, referring to periods of the operation of the power supply the arc voltage $V'_{arc}$ may be derived as:
For t=(n−1)T (n−1+D(n))T (stage I)

$$V'_{arc} = \frac{V_{20}[n] \cdot V_{22}[n-1] + V_F[n-1] \cdot V_{21}[n]}{V_{20}[n] + V_F[n-1] - \Delta V_1[n]} \quad (3a)$$

where $\Delta V_1[n] = V_{21}[n] - V_{22}[n-1]$,

While for t=(n−1+D(n))T . . . (n)T (stage II)

$$V'_{arc} = \frac{V_{20}[n] \cdot V_{22}[n] + V_F[n] \cdot V_{21}[n]}{V_{20}[n] + V_F[n] - \Delta V_2[n]} \quad (3b)$$

where $\Delta V_2[n] = V_{21}[n] - V_{22}[n]$.

The arc voltage on the particular cycle of the power supply operation value may be calculated once using one of equations (3a) or (3b) or twice using both equations.

In order to reduce probability of distortion of the result caused by time coincidence of the transition between stages and a rapid voltage change, sampling may be performed, as shown in FIG. 5, in a moment just before and sometime after transition between stages I and II. However, in practice, controller 220 may take many samples, depending on system capacity. Different methods of filtering, which can reduce noise, cancel ripple and exclude instances of rapid voltage change may also be employed. If a filtering process is employed, then the values in the equations may be replaced, for instance, by the average values calculated for a given state. In FIG. 5, averaging was applied to $V_{21}$ ($V_{21av}$) and $V_{22}$ ($V_{22av}$). However, to reduce noise, averaging can also be applied to $V_{20}$ and $V_F$.

Limitations

During the fast transitions, voltages $V_{21}$ and $V_{22}$ may be measured at different arc voltage $V'_{arc}$. The present method though, is based on the assumption of equality of $V'_{arc}$ in adjacent stages I and II. Moreover, both values are placed in the denominator of the formulas. As a result, the arc voltage derived according to formulas (3), (3a), (3b) may be significantly different from the real value.

An assumption of constant $V'_{arc}$ in adjacent stages leads to the equation:

$$V_{21} - V_{22} = (V_{20} + V_F)\frac{L_2}{L_1 + L_2} \quad (4)$$

Oppositely to the fast changing arc voltage $V_{arc}$, the output current $I_2$, both internal and external inductances, respectively, $L_1$ and $L_2$, the first internal voltage $V_{20}$ and the second internal voltage $V_F$ do not change instantly and can be assumed invariant within two consecutive stages of the operation.

Consequently as long as the difference $V_{21} - V_{22}$ in consecutive steps of sampling is not changing rapidly, the assumption of the equality, or similarity of arc voltage during two steps of sampling id fulfilled and the method of calculation is valid.

Thus reversely, the limitations can be imposed on the differences $V_{21} - V_{22}$ to keep the method valid.

$\Delta V_1[n] > \Delta V_2[n-1] \cdot (1-\partial)$, if not $\Delta V_1[n] = \Delta V_2[n-1] \cdot (1-\partial)$ (5)

$\Delta V_1[n] < \Delta V_2[n-1] \cdot (1+\partial)$, if not $\Delta V_1[n] = \Delta V_2[n-1] \cdot (1+\partial)$ (6)

$\Delta V_2[n] > \Delta V_1[n] \cdot (1-\partial)$, if not set $\Delta V_2[n] = \Delta V_1[n] \cdot (1-\partial)$ (7)

$\Delta V_2[n] < \Delta V_1[n] \cdot (1+\partial)$, if not set $\Delta V_2[n] = \Delta V_1[n] \cdot (1+\partial)$ (8)

where $\partial$ is margin of change, assumed as low as 0.01 . . . 0.1.

Alternatively, when only one voltage per period is calculated the following limitations may be applied:

$$\Delta V_2[n] > \Delta V_2[n-1] \cdot (1-\partial), \text{ if not } \Delta V_2[n] = \Delta V_2[n-1] \cdot (1-\partial) \quad (9)$$

$$\Delta V_2[n] < \Delta V_2[n-1] \cdot (1+\partial), \text{ if not } \Delta V_2[n] = \Delta V_2[n-1] \cdot (1+\partial) \quad (10).$$

During the start of the welding process or in a case of disturbances in welding, especially open circuit states, the initial reference values of $\Delta V_1$, $\Delta V_2$ are preferably used. The values can be memorized based on previous measurements or calculated according to parameters of the power supply according to equation (4).

Open Circuit and High Load Resistance Stages

In an open circuit stage all previous assessments are false. In this stage, the output current is zero and voltage before the inductor $L_1$ is the same as the voltage after the inductor $L_1$, and the same as arc voltage.

Thus when an open circuit (OC) state is detected the arc voltage measurement should be switched to a continuous measurement of the voltage on the output of the power supply.

Then, $$V_{arc}(t) = V_2(t); \text{ for } I_2(t) < I_{20} \quad (11)$$

where $I_{20}$—minimum current level for OC detection.

Low-pass filtering is preferably applied to the voltage measured on the output of the power supply. An analog filter with a corner frequency a few times lower than the output voltage ripple frequency is preferably applied. A digital low pass filter can also applied in this state.

Then the arc voltage in discrete moments of time may be defined as average value within the period:

$$V_{arc}[n] = \frac{1}{T} \int_{nT}^{(n+1)T} V_2(t) \, dt \quad (12)$$

Freewheeling Phase/Pulse Skipping Phase

The method described above derives values from the two stages of operation of the SMPS 210. However, during constant operation and during the switch-off phase, the SMPS 210 does not deliver power and there is only the freewheeling stage (stage II) which normally lasts a time span equal to tens of SMPS operation periods. The control system may also command to suspend power delivery state, for one or few periods, which is considered pulse skipping.

Figure 6:
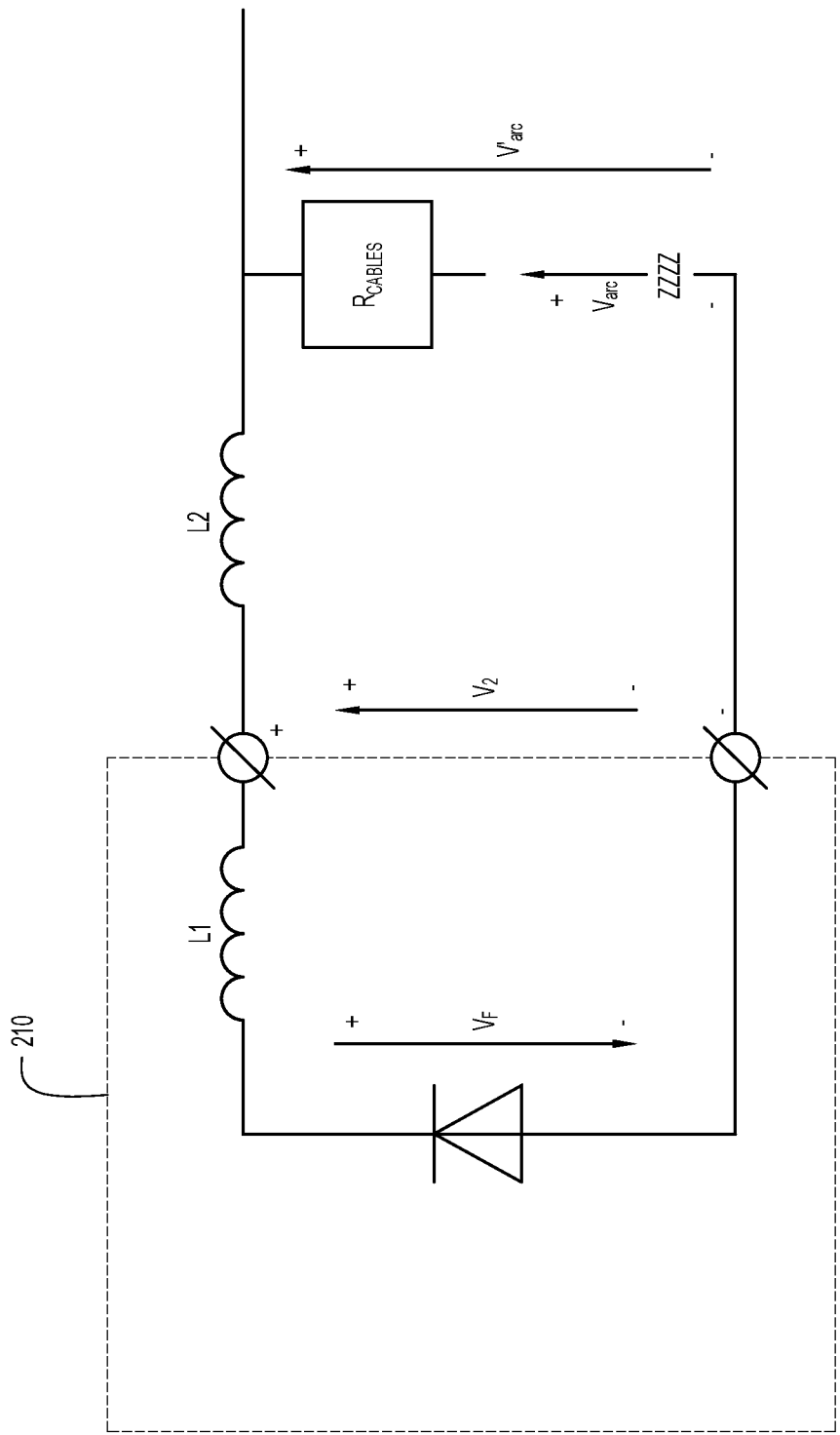
FIG. 6 illustrates a simplified schematic diagram of the welding system in a freewheeling stage in accordance with an example embodiment.

FIG. 6 illustrates a simplified schematic diagram of the welding system in a freewheeling stage (and without a controller that controls the switch mode power supply) in accordance with an example embodiment.

The external inductance $L_2$, however unspecified, may be treated as linear. On the other hand, $L_1$ is a particular component having the inductance roughly pre-defined as the function of the current:

$$L_1 = F(I_2); \quad (13)$$

Then, when the first pulse skipping stage is detected (no signal at the beginning of the period) it is possible to define $L_2$, and, with reference to FIG. 6:

$$L_2 = \frac{V'_{arc}[0] - V_2[0]}{V_2[0] + V_F[0]} \cdot L_1(I_2[0]); \quad (14)$$

Then, $$V'_{arc}(t) = \frac{V'_{arc}[0] - V_2[0]}{V_2[0] + V_F[0]} \cdot \frac{L_1(I_2[0])}{L_1(I_2(t))} \cdot \{V_2(t) + V_F(t)\} + V_2(t); \quad (15)$$

In discrete moments of time the arc voltage function is defined as:

$$V'_{arc}[n] = \frac{V'_{arc}[0] - V_2[0]}{V_2[0] + V_F[0]} \cdot \frac{L_1(I_2[0])}{L_1(I_2[n])} \cdot \{V_2[n] + V_F[n]\} + V_2[n]; \quad (16).$$

In order to complete the voltage measurement the compensation of the voltage drop on the external resistance $R_2$ may be applied according to equation:

$$V_{arc}[n] = V'_{arc}[n] - R_2 \cdot I_2[n] \quad (17)$$

where the resistance of the external cables $R_2$ is predetermined. The resistance $R_2$ may be measured during procedure of calibration or assessed based on the derived characteristics of the cables. Derivation may be based on constant or temperature dependent assumptions. In the latter case the characteristics may be derived from a thermal model, utilizing different input data such as temperatures, current and time.

In this way, the method of definition of the momentary arc voltage without influence of inductance of the connecting cables includes all three possible instances of the switch mode power supply operation: switching operation, open circuit operation and free-wheeling operation.

The method describe herein relies on fast voltage sampling in the well-defined moments in relation to changes of the stage of the convertor. In particular, the sampling preferably precedes the switching and also is preferably slightly delayed in relation to the switching moment. Therefore, and as an example, a first-in-first-out (FIFO) buffer (implemented, e.g., within memory 285) may be applied to choose the right samples. The buffer can be also used for intelligent filtering. It is also possible to apply synchronized timing to the control system of the PWM converter and the voltage measurements. In a preferred implementation, a combination of both approaches may be applied.

If an analog system is applied, at least for simulation, it preferably implements a plurality of sample and hold circuits (S/H) synchronously operated with the SMPS 210, with respect to required precedencies and delays that would exclude false sampling during the transition between the phases of the operation.

Figure 7:
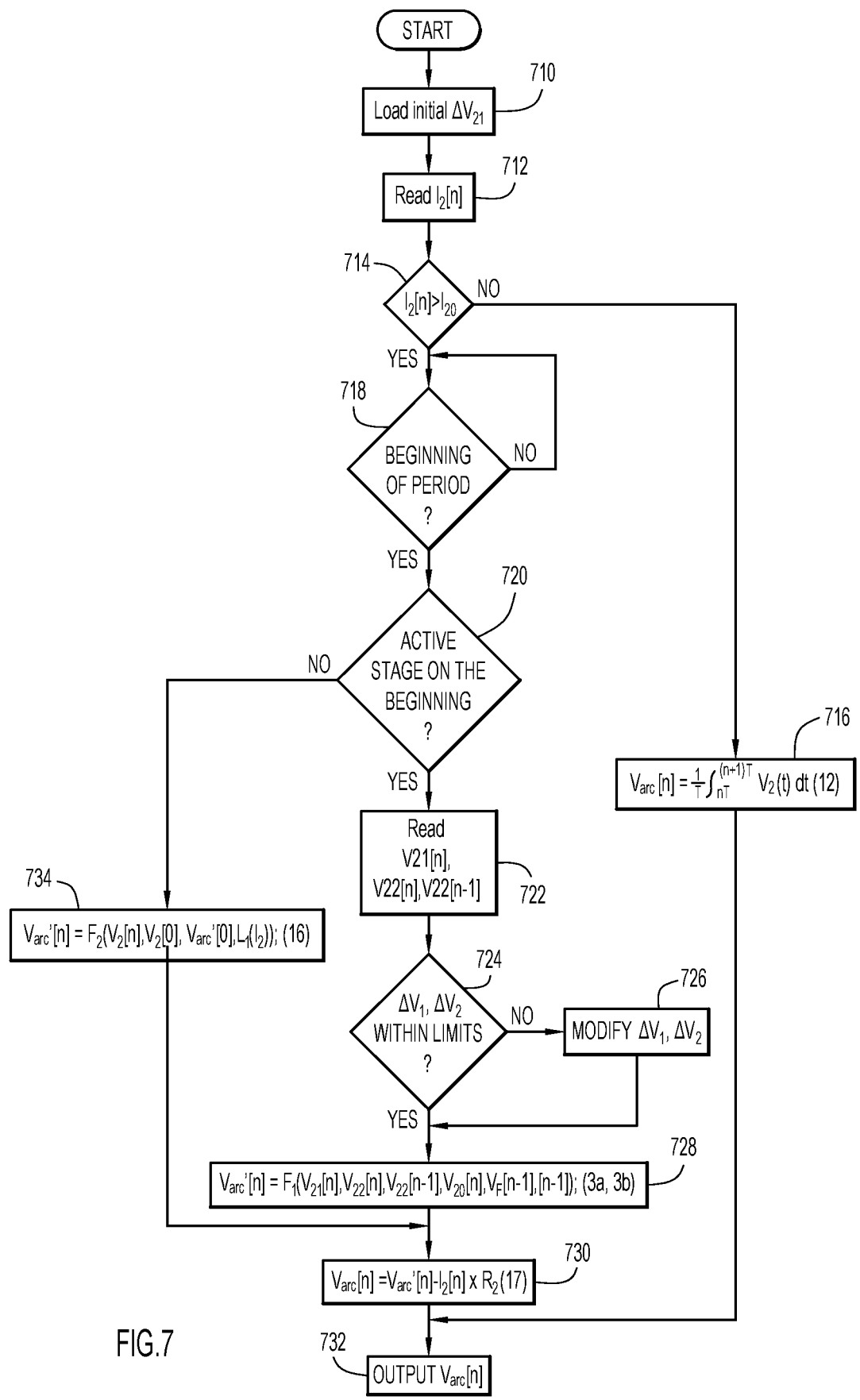
FIG. 7 is a flow chart illustrating a series of steps for determining arc voltage without sensing cables deployed at a power receiver in accordance with an example embodiment.

FIG. 7 is a flow chart illustrating a series of steps or operations for determining arc voltage without sensing cables deployed at a power receiver, in accordance with an example embodiment. The operations may be performed by, e.g., controller 220 via hardware, firmware and or software, or combinations thereof. The hardware may comprises logic circuits implemented by an integrated circuit such as an application specific integrated circuit (ASIC) i.e., processor 286). Memory 285 for storing logic instructions (i.e., software) and data (e.g., voltage, current and inductance measures) may be provided within controller 220 and processor 286 may be configured to execute the logic instructions to perform the operations outlined in FIG. 7.

At 710, an initial $\Delta V_{21}$ is loaded. At 712, current $I_2[n]$ is read or sampled. At 714, it is determined whether $I_2[n]$ is greater than 120, a minimum current level for open circuit detection. If $I_2[n]$ is not greater than that threshold, then at 716, Varc[n] is calculated in accordance with equation (15).

If at 714, it is determined whether I$_2$[n] is greater than I$_{20}$, then operation 718 forces the process to delay until the beginning of a period. At 720 it is determined whether the state of the system is active at the beginning of the period. That is, it is determined whether the switch mode power supply is in a freewheeling or pulse skipping phase. If yes (i.e., not active), then at 734, Varc' is calculated in accordance with equation (16). Varc is then, at 730, calculated at operation 730, and at 732, Varc is output from controller 220 and provided to switch mode power supply 210 to complete the feedback loop to control the switch mode power supply accordingly.

If at 720 the switch mode power supply was active, e.g., in a power delivery stage, then at 722 voltages V$_{21}$[n], V$_{22}$[n] and V$_{22}$[n−1] are read, e.g., from memory. At 724, it is determined whether ΔV$_{21}$ is within acceptable limits as discussed above. If not, then at 726 ΔV$_{21}$ is modified to, e.g., within 95%-105%. At 728, Varc'[n] is then calculated in accordance with equations (3a) and (3b). The calculated value of Varc'[n] is then used in operation 730 to calculate Varc, which is output from controller 220 and provided to switch mode power supply 210 to complete the feedback loop to control the switch mode power supply accordingly.

Operation 730 subtracts the voltage drop attributable to the welding cables' (i.e., external) resistance at the given period's current I$_2$. Resistance of the cables may be, for instance, measured before the welding operation, without application of special measurement equipment, but by means of the equipment itself. For example, a special operation mode may be selected by the operator, whereby the operator short circuits the conductors on the end of supplying cables, for instance by pressing the tip of the welding torch to the workpiece. The power supply may then deliver a current of a particular value and the control system may thus derive the resistance from measured output voltage. A default value may also be employed. In this instance, the operator may be asked to input parameters of the cables via equipment interface. An example input might be: 25 m of 95 square millimeter cable and 5 m of water cooled torch with 25 square millimeter conductor.

The arc voltage and the welding current and their derivatives in time deliver information about the physical state of the welding. For instance, very low voltage means a short circuit between an electrode and a welding bath. A rapid growth of voltage preceded by the low voltage indicates end of the short circuit phase. The high voltage and lowering current indicate open circuit. In an effort to achieve high quality welding such states are preferably identified precisely and without delay. Dependent on the identification of the state of welding, the control system may employ different ways of regulation. In particular, constant arc length mode may be employed where constant arc voltage must be kept, which can be accomplished only by having an accurate and fast response arc voltage sense signal. The constant power or any other output volt−amp characteristic different from constant current characteristic also requires that the voltage sense signal be delivered in a fast and accurate way.

Figure 8:
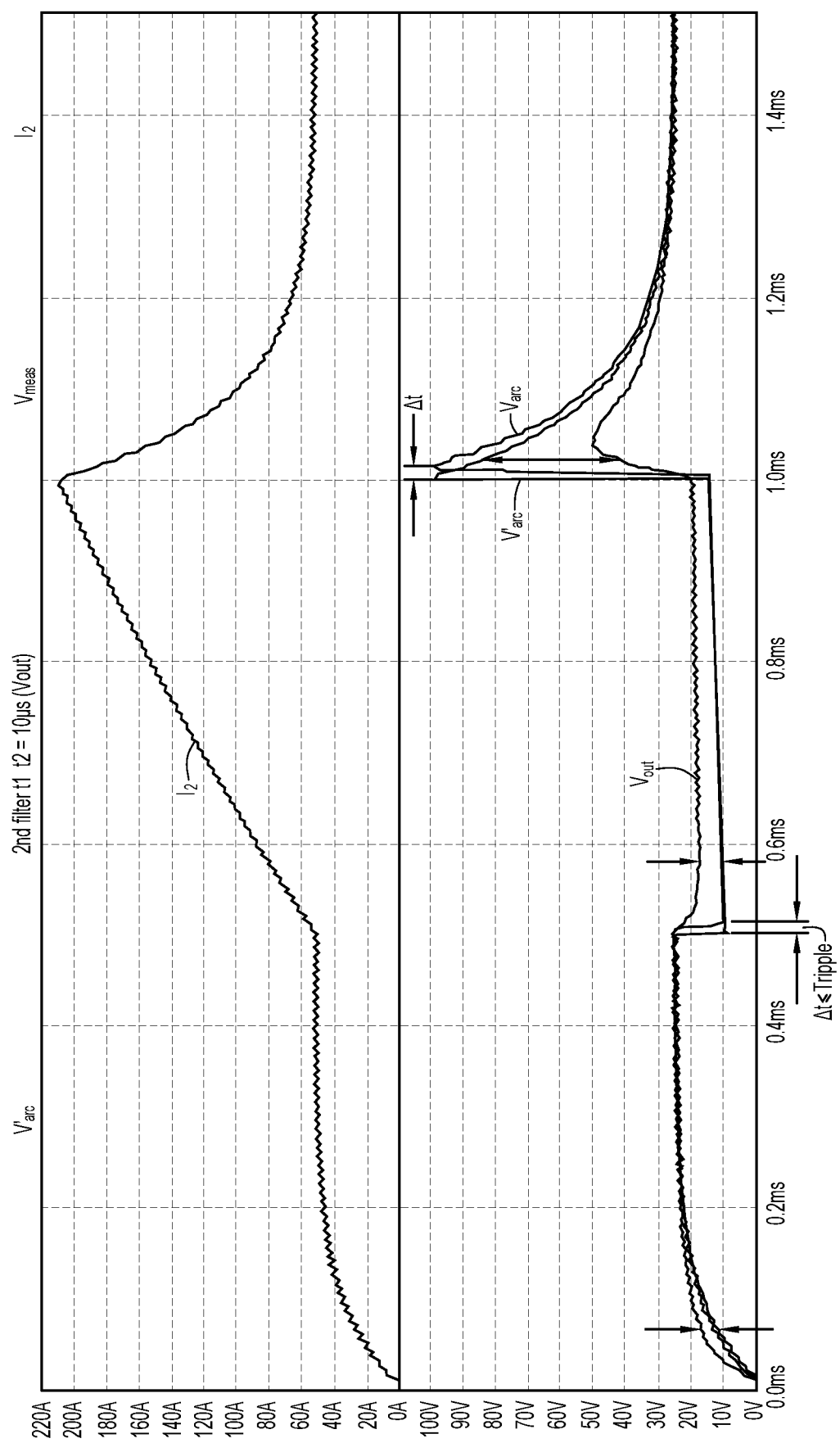
FIG. 8 shows an example of voltage and current transitions of output current and arc voltage corrected by the approach described herein in accordance with an example embodiment.

FIG. 8 shows an example graph of measures of voltage and current for current transitions of output current and arc voltage corrected by the approach described herein. Assumptions in connection with the graph of FIG. 8 are that the switch mode power supply 210 starts its operation with constant 50% duty cycle and 50V amplitude, and only the load changes: first at 0.5 ms, then at 1 ms.

As shown, when the output current is more or less constant, the voltage measured on the output Vout (filtered 2-nd order filter τ1=τ2=10 μs), is the same as the voltage on the resistive load (the arc voltage+resistive voltage drop on cables, V' arc). When current is changing, the filtered voltage on the output significantly differs from the voltage on the load (differences marked by two headed arrows).

The voltage, Varc, restored by the methodology described herein is much more accurate, although delayed for one period, which is well-seen in moments of rapid changes of the voltage. In a particular example, a second order filter creates a delay that two times larger. In a high frequency device, however, one ripple period delay is insignificant.

The above description is intended by way of example only. Various modifications and structural changes may be made therein without departing from the scope of the concepts described herein and within the scope and range of equivalents of the claims.

What is claimed is:

1. A method for determining a value of arc voltage in a welding system without voltage sensing cables in the vicinity of a welding arc, the welding system including a switch mode power supply and a controller that controls operation of the switch mode power supply, the switch mode power supply including an internal inductor having a predetermined inductance value, the method comprising:
   sensing a first internal voltage (V$_{20}$) within the switch mode power supply prior to the internal inductor during an active power delivery stage of the switch mode power supply;
   sensing a first output voltage (V$_{21}$) of the switch mode power supply during the active power delivery stage of the switch mode power supply;
   sensing a second internal voltage (V$_F$) within the switch mode power supply prior to the internal inductor during a freewheeling stage of the switch mode power supply;
   sensing a second output voltage (V$_{22}$) of the switch mode power supply during the freewheeling stage of the switch mode power supply; and
   determining the value of arc voltage based on the first internal voltage, the first output voltage, the second internal voltage, and the second output voltage.

2. The method of claim 1, wherein a period of operation of the switch mode power supply comprises one active power delivery stage and one freewheeling stage, the method further comprising determining the value of arc voltage for each period of operation of the switch mode power supply.

3. The method of claim 1, further comprising sensing a welding current, and determining whether a value of the welding current indicates an open circuit condition in the welding system.

4. The method of claim 1, wherein the welding system includes welding cables between an output of the switch mode power supply and a power receiver, and the step of determining the value of the arc voltage is performed without an indication of a value of inductance associated with the welding cables.

5. The method of claim 4, further comprising determining the value of the arc voltage based on a voltage drop attributable to resistance of the welding cables.

6. The method of claim 1, further comprising, when the switch mode power supply is in the freewheeling stage for more than one cycle, using the predetermined inductance value of the internal inductor to determine the arc voltage.

7. The method of claim 1, wherein values for the first internal voltage, the first output voltage, the second internal voltage, and the second output voltage are stored for each cycle of operation of the switch mode power supply.

8. The method of claim 7, further comprising correcting a potentially distorted arc voltage value based on stored values of the first internal voltage, the first output voltage, the second internal voltage, and the second output voltage.

9. The method of claim 1, further comprising controlling the operation of the switch mode power supply based on the value of the arc voltage.

10. A welding power supply configured to determine a value of arc voltage in a welding system without voltage sensing cables in the vicinity of a welding arc, the welding power supply including a switch mode power supply and a controller that controls operation of the switch mode power supply, the switch mode power supply including an internal inductor having a predetermined inductance value, the welding power supply including a processor that, when executing logic instructions, is configured to:
sense a first internal voltage ($V_{20}$) within the switch mode power supply prior to the internal inductor during an active power delivery stage of the switch mode power supply;
sense a first output voltage ($V_{21}$) of the switch mode power supply during the active power delivery stage of the switch mode power supply;
sense a second internal voltage ($V_F$) within the switch mode power supply prior to the internal inductor during a freewheeling stage of the switch mode power supply;
sense a second output voltage ($V_{22}$) of the switch mode power supply during the freewheeling stage of the switch mode power supply; and
determine the value of arc voltage based on the first internal voltage, the first output voltage, the second internal voltage, and the second output voltage.

11. The welding power supply of claim 10, wherein a period of operation of the switch mode power supply comprises one active power delivery stage and one freewheeling stage, and wherein the processor is further configured to determine the value of arc voltage for each period of operation of the switch mode power supply.

12. The welding power supply of claim 10, wherein the processor is further configured to sense a welding current, and determine whether a value of the welding current indicates an open circuit condition in the welding system.

13. The welding power supply of claim 10, wherein the welding system includes welding cables between an output of the switch mode power supply and a power receiver, and the processor is further configured to determine the value of the arc voltage without an indication of a value of inductance associated with the welding cables.

14. The welding power supply of claim 13, wherein the processor is further configured to determine the value of the arc voltage based on a voltage drop attributable to resistance of the welding cables.

15. The welding power supply of claim 10, wherein, when the switch mode power supply is in the freewheeling stage for more than one cycle, the processor is further configured to use the predetermined inductance value of the internal inductor to determine the arc voltage.

16. The welding power supply of claim 10, wherein values for the first internal voltage, the first output voltage, the second internal voltage, and the second output voltage are stored for each cycle of operation of the switch mode power supply.

17. The welding power supply of claim 16, wherein the value of the arc voltage is corrected based on stored values for the first internal voltage, the first output voltage, the second internal voltage, and the second output voltage.

18. The welding power supply of claim 10, wherein the processor is further configured to control the operation of the switch mode power supply based on the value of the arc voltage.

* * * * *